(12) United States Patent
Russell (10) Patent No.: US 10,534,690 B1
(45) Date of Patent: Jan. 14, 2020

(54) CONCURRENT QUALITY TESTING BY BROADCASTING USER EVENTS

(71) Applicant: INTUIT INC., Mountain View, CA (US)

(72) Inventor: Stuart Brevard Russell, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 23 days.

(21) Appl. No.: 15/499,588

(22) Filed: Apr. 27, 2017

(51) Int. Cl.
*G06F 11/36* (2006.01)
*H04L 29/08* (2006.01)

(52) U.S. Cl.
CPC .......... *G06F 11/3608* (2013.01); *H04L 67/22* (2013.01); *H04L 67/10* (2013.01)

(58) Field of Classification Search
CPC ............................................ G06F 11/30–3696
See application file for complete search history.

(56) References Cited

U.S. PATENT DOCUMENTS

| | | | | |
|---|---|---|---|---|
| 8,291,387 B2* | 10/2012 | Pal | ...................... | G06F 11/3688 703/21 |
| 9,424,167 B2* | 8/2016 | Lee | ...................... | G06F 11/3664 |
| 2011/0289489 A1* | 11/2011 | Kumar | ................ | G06F 11/3664 717/135 |
| 2013/0167116 A1* | 6/2013 | Mahmud | ............. | G06F 11/3672 717/120 |
| 2015/0339213 A1* | 11/2015 | Lee | ...................... | G06F 11/3664 717/125 |
| 2016/0232085 A1* | 8/2016 | Vorganti | ............. | G06F 11/3692 |
| 2016/0364310 A1* | 12/2016 | Maple | .................... | G06F 11/302 |
| 2018/0039565 A1* | 2/2018 | Rajagopalan | ....... | G06F 11/3664 |

* cited by examiner

*Primary Examiner* — Eric C Wai
(74) *Attorney, Agent, or Firm* — Patterson + Patterson, LLP (57) ABSTRACT

This disclosure relates to quality control testing of software and hardware applications, and more specifically to performing quality control testing concurrently on multiple software deployments. The method and system monitor user inputs on a master machine to capture user events that are translated into action paths and action requests that concurrently reproduce the user event on a set of test machines with a variety of hardware configurations and software versions.

20 Claims, 7 Drawing Sheets

CONCURRENT QUALITY TESTING BY BROADCASTING USER EVENTS

BACKGROUND

Field

Embodiments presented herein generally relate to quality control testing of software applications, and more specifically to performing quality control testing concurrently on multiple software deployments.

Description of the Related Art

Developers of commercial software can create multiple versions for the same application to accommodate the needs of specific customers or differences in geographic regions. The different software versions provide most of the same functionality, but include some differences unique enough to warrant a separate version of the application. A small number of software version applied across a small number of hardware platforms can quickly result in an overwhelming number of combinations. Each combination needs to be tested for quality control before release, and thus, as the number of combinations increase, the labor required to manually test each version also increases. The manual testing burden consumes significant resources and delays product releases, making it more difficult for software developers to add or change product features in response to market demand.

SUMMARY

One embodiment of the present disclosure includes a method for testing multiple machines. The method includes detecting, on a master machine, a user event, and generating an action request representing the user event. The method also includes determining whether the action request includes a command requiring an action path, and generating a set of action paths describing the user event where each action path is formatted for a combination a hardware instance and a software instance. The method also includes adding the set of action paths to the action request, and adding the action request to each target machine queue in a set of target machine queues.

Another embodiment provides a computer-readable storage medium having instructions, which, when executed on a processor, operates to test multiple machines. The operation includes detecting, on a master machine, a user event, and generating an action request representing the user event. The operation also includes determining whether the action request includes a command requiring an action path, and generating a set of action paths describing the user event where each action path is formatted for a combination a hardware instance and a software instance. The operation also includes adding the set of action paths to the action request, and adding the action request to each target machine queue in a set of target machine queues.

Still another embodiment of the present invention includes a processor and a memory storing a program, which, when executed on the processor, performs an operation for testing multiple machines. The operation includes detecting, on a master machine, a user event, and generating an action request representing the user event. The operation also includes determining whether the action request includes a command requiring an action path, and generating a set of action paths describing the user event where each action path is formatted for a combination a hardware instance and a software instance. The operation also includes adding the set of action paths to the action request, and adding the action request to each target machine queue in a set of target machine queues.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Generally, developers of commercial software applications create multiple iterations of an application to accommodate different combinations of customer hardware and operating systems. Developers also create different versions of applications for specific markets or customers. For example, a developer can create an application with an iteration for machines running the Microsoft Windows 10 operating system and an iteration for machines running Apple's OS X operating system. The developer can also create several different versions of the application, such as by language—French, English, Spanish, etc., or by country, such as United States, Canada, England, France, etc. The combination of operating system iterations and versions quickly creates a large number of individual instances of a single application, all of which the developer needs to test to ensure quality control. Typically, a developer uses employees to perform the testing one instance at a time, which significantly delays the final production of the application or requires many people to be devoted to performing the testing.

Embodiments presented herein provide a system for concurrently testing numerous instances of an application. The system includes a master machine configured with a software program to observe user input and translate the user's input into events. As events are captured, the program creates action requests designed to recreate the event on a specific program instance using one or more commands that can, in some cases, include a set of action paths. For example, when the program detects user input to "click submit button" the program will generate an action request designed to instruct an instance of the program to "click" the same submit button. When an action request includes commands to locate program elements, the action request includes a set of action paths that identifies the target using different paths that refer to programmatic elements. The system creates an action path for each specific program variation/machine/operating system combination. Thus, the instructions for each action path tailored interoperate with the underlying operating system and program variation. The program adds the action request with the included commands and, in some cases, action paths, to each test target machine queue. The system maintains an independent queue for each machine being testing, where each queue includes a copy of the action requests generated from the user events on the master machine. Using separate queues for each test target machine allows the playback machines to execute the user input events independent of one another.

Figure 1:
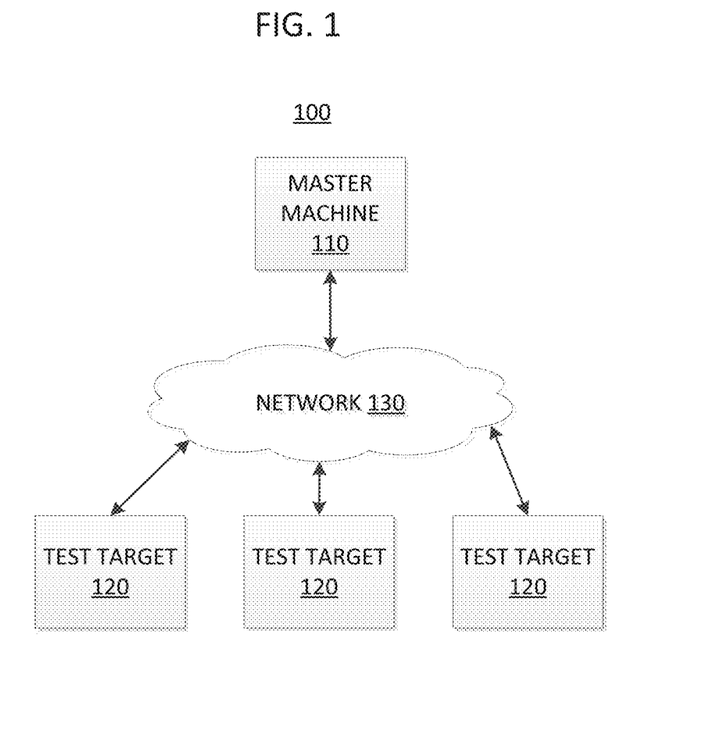
FIG. 1 illustrates an example system, according to one embodiment.

FIG. 1 illustrates an example system 100, according to one embodiment. As shown, system 100 includes master machine 110, and one or more test target machines 120 that communicate over network 130.

Figure 2:
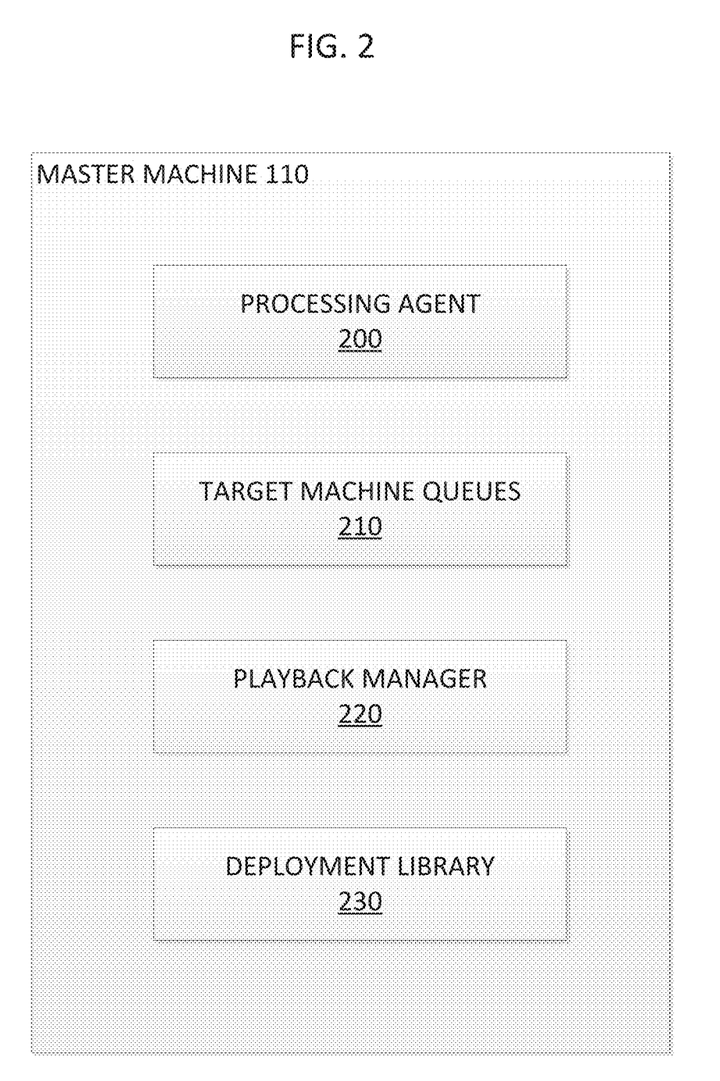
FIG. 2 is a block diagram illustrating an example master machine, according to one embodiment.

FIG. 2 is a block diagram illustrating a master machine 110, according to one embodiment. As shown, master machine 110 includes a processing agent 200, one or more target machine queues 210, a playback manager 220, and a deployment library 230. Master machine 110 uses processing agent 200 to detect user input events on master machine 110 and to generate action requests from those events. Processing agent 200 detects user input events by monitoring the user interface of the master machine 110. When processing agent 200 detects an event, such as clicking on a web form field or a UI button, the event is recorded as a logical location in the user interface. That is, the event is recorded by referring to programmatic elements in the source information used to generate the user display, rather than as a physical coordinate on the screen.

Processing agent 200 translates each detected event into an action request. An action request includes a code portion and a variable set, where the code reproduces the type of event and the variables describe the specific event instance recorded. For example, the code portion of an action request can include a command, such as an http request, to perform an action on the test target 120, such as creating a session with a test target, finding an element, moving to a point on the display, clicking on an element in the user interface, pressing or releasing a key, or deleting/ending a session. In an embodiment, processing agent 200 uses the Selenium WebDriver protocol for commands. The code element can include a single command or several commands to perform an action such as creating a session, getting a status, and deleting the session. The code element can also include logic that determines which commands, if any, will be executed based on the values of the variables, prior command results, and other system information.

Figure 3:
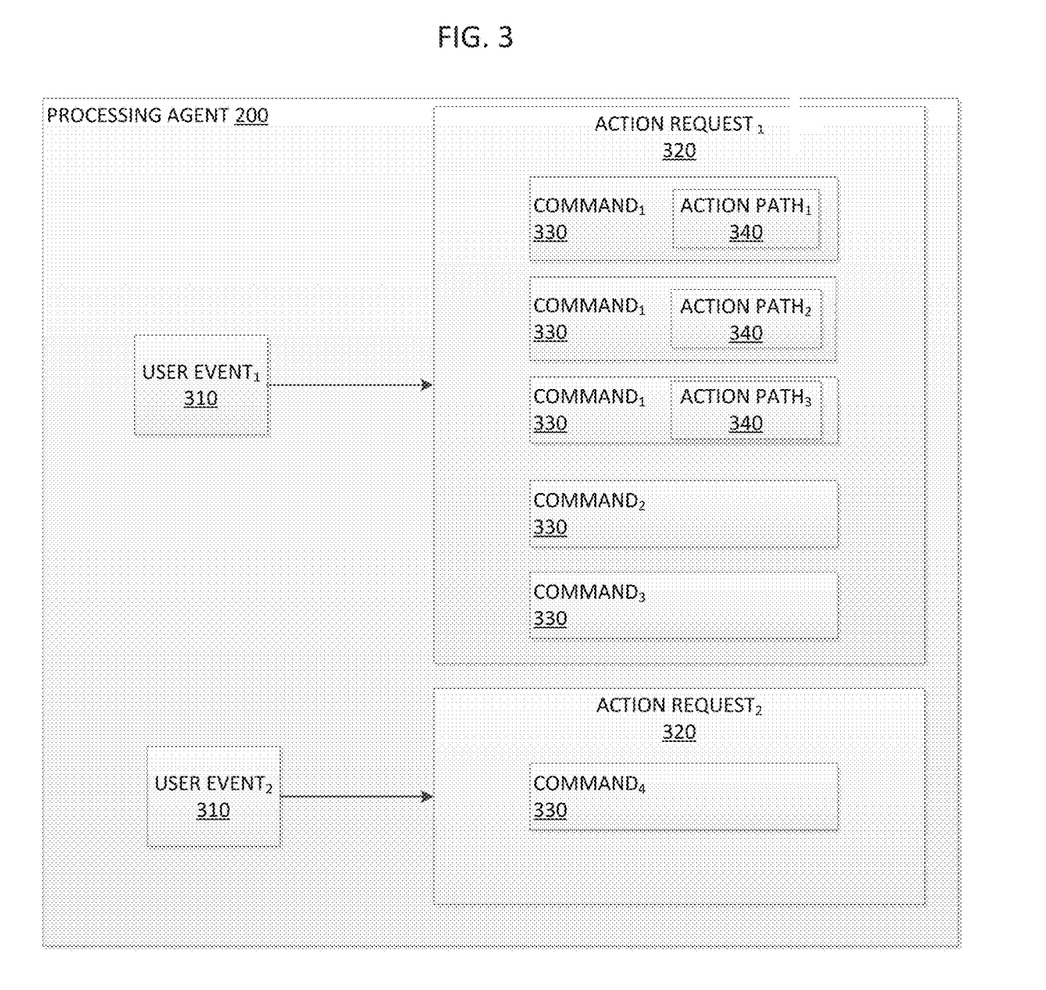
FIG. 3 is a block diagram illustrating an example relationship between user events, action requests, and action paths, according to one embodiment.

FIG. 3 is a block diagram illustrating the flow of generating action requests. As shown, processing agent 200 detects a user event 310 on the master machine 110 and generates an action request 320 to represent the user event 310. FIG. 3 depicts two action requests 320 being generated from the user events 310. Processing agent 200 interprets user event$_1$ 310 by classifying the type of user action, i.e., "move and find," "click," "keystroke," and selecting an action request with a code element configured to perform the matching event. Processing agent 200 is shown as interpreting user event$_1$ 310 as needing an action request 320 with three separate commands$_{1-3}$ 330 where command$_1$ 330 includes requires a set of action paths$_{1-3}$ 340. Processing agent 200 generates the set of action paths 340 for a command$_1$ 330 of the action request 320 based on the recorded user event 310, such as locating an element in the user interface. Each action path 340 is designed to locate the user interface element a specific target machine, i.e., operating system and software version. Processing agent 200 creates an action path 340 for each known configuration of operating system and software version. The combinations of operating system and software versions are maintained in deployment library 230 and accessed by processing agent 200 when generating a command 330 that includes one or more action paths 340. In an embodiment, processing agent 200 can use the software/hardware configurations of the set of test targets 120 reduce the number of action paths 340 that are generated.

For example, the test targets 120 for a specific test all run Windows, then processing agent 200 does not need to generate action paths 340 that represent element paths in machines running versions of OS X. Processing agent 200 can receive information about the test targets from a configuration as part of the test set-up or processing agent 200 can query each test target 120 directly when establishing a connection between each test target 120 and that test target's associated target machine queue 210.

The action request$_1$ 320 in FIG. 3 includes command$_1$ 330 with each of action paths$_{1-3}$ 340. When the action request$_1$ 320 is executed, command$_1$ 330 with action path$_1$ 340 is sent to the test target 120, and the logic in action request 320 is used to determine whether command$_1$ 330 needs to be resent using action paths$_{2-3}$. If action request$_1$ 320 receives a result from test target 120 including an element ID, then command$_1$ was successful, and the action request$_1$ 320 skips the remaining command$_1$ embodiments and sends command$_2$ to the test target 120. If action request$_1$ 320 receives a result from test target 120 with an error, then command$_1$ 330 failed using action path$_1$ 340, so action request 320 sends command$_1$ 330 with action path$_2$ 340 to the test target 120 to attempt to complete command$_1$ 330. Action request$_1$ 320 continues iterating through the set of action paths 340 for a command 330 until it receives a successful result, or until all action paths 340 have been attempted.

Not all action requests 320 will include a command 330 including action paths 340, as shown by processing agent 200 translating user event$_2$ 310 into action request$_2$ 320 that includes only a single command 330. An action request 320 can also include multiple commands 330 that include a set of action paths 340. After each action request 320 has been generated, processing agent 200 inserts each action request 320 into each target machine queue 210.

Figure 4:
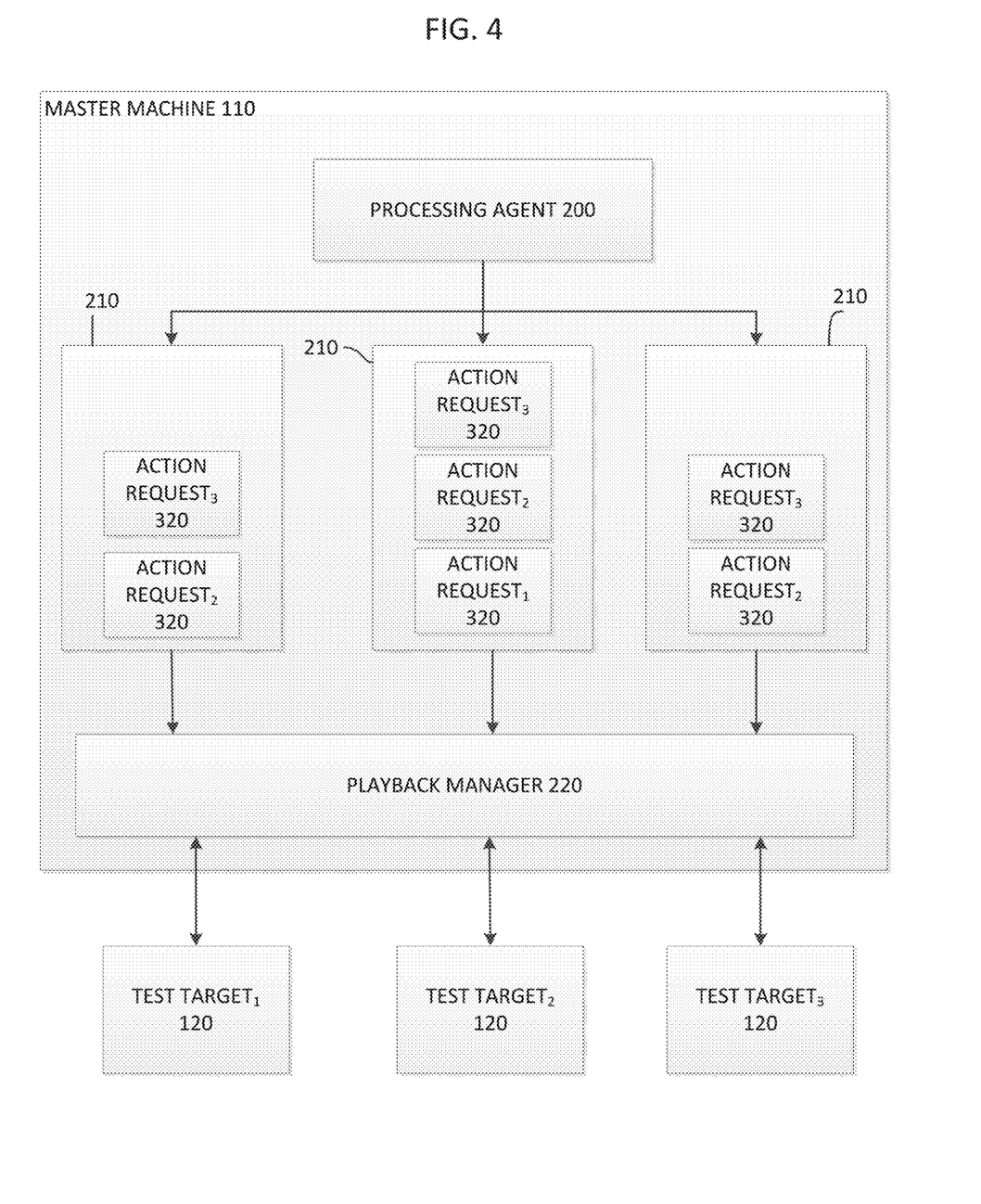
FIG. 4 is a block diagram illustrating an example master machine interacting with test targets, according to one embodiment.

FIG. 4 is a block diagram illustrating the relationship between the master machine and the test targets. As shown, master machine 110 includes a target machine queue 210 for each test target 120. Processing agent 200 generates action requests 320 for user events 310 detected on the master machine 110. Processing agent 200 copies each action request 320 into each target machine queue 210, which allows each target machine 120 to execute the testing procedure embodied in the series of user events concurrently. That is, each test target 120 receives commands 330 of action requests 320 from a dedicated target machine queue 210 maintained on the master machine 110. This allows some test targets 120 to execute action requests 320 faster than other test targets 120, and removes the need for some test targets 120 to block or wait for other test targets 120 such as when using a common queue. For example, a first test target 120 could successfully perform an action request 320 that includes a command with action paths using with the first action path 340, while a second test target 120 may need to attempt several action paths 340 before completing the same action request 320. A third test target may attempt all of the action paths 340 for the same action request 320 command but fail to complete the event, thereby failing the test. Each of the first, second and third test target machines 120 can proceed concurrently and independently because each test target 120 has its own target machine queue 210.

Playback manager 220 removes action requests 320 from the target machine queues 210 and executes the action request 320. The action request 320 communicates with the test targets 120 by sending commands 330 from the action request 320 and receiving results for each command 330 from the test target 120. When a test target 120 receives a command 330, the test target 120 attempts to execute the command to achieve the event, and reports the result of the action request 320 to the action request 320 executing in the playback manager 220. For an action request 320 with a command 330 including action paths 340, the action request 320 iterates through the action paths 340 for the command 330 until either the command 330 is successful, or all action paths 340 were unsuccessful. Playback manager 220 executes action requests 320 for user events 310 as the test target 120 reports success for the prior action request 320 until all action requests 320 have been executed, or an action request 320 fails. When the test target 120 fails to execute an action request 320, no further action requests 320 are executed for that test target 120. Playback manager 220 records the failure of the test target 120, and in some embodiments, displays a visual indicator in the user interface of the master machine 100 indicating that the test target 120 has failed.

Figure 5:
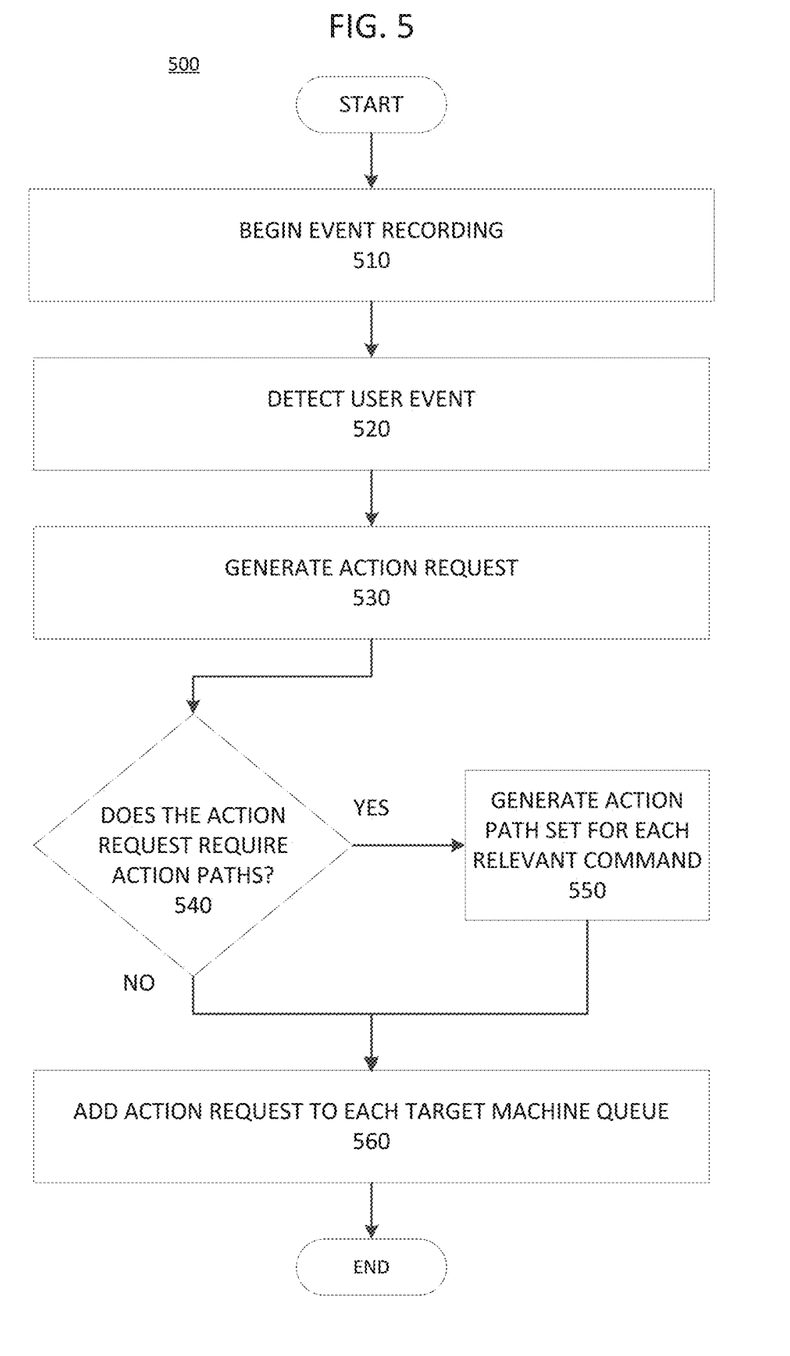
FIG. 5 is a flow chart illustrating a process for creating action requests, according to one embodiment.

FIG. 5 illustrates a process for creating action requests 320 for each test target, according to an embodiment. Processing agent 200 begins the process 500 at step 510 by beginning to record the user inputs on the master machine 110. Processing agent 200 continuously monitors the user input until it detects an event 310, such as at step 520. At step 530, processing agent 200 generates an action request 320 corresponding to the type of event 310 detected. The action request 320 includes one or more commands 330 describing the user event 310. At step 540, processing agent 200 determines whether the action request 320 is of the type that includes one or more commands 330 that require action paths 340. If so, at step 550 processing agent 200 generates a set of action paths 340 for the detected event 310 for each command 330 that requires action paths 340, and adds the one or more set of action paths 340 to the action request 320. At step 560, processing agent 200 adds the action request 320 to each target machine queue 210.

Once each action request 320 has been added to each target machine queue 210, playback manager 220 begins executing the action requests 320 from the target machine queues 210, and the executing action requests 320 send commands 330 to the associated test targets 120. Processing agent 200 continues monitoring user input on the master machine 110 during process 500 and can detect additional user events 310 while a prior event is handled by process 500. Processing agent 200 can process user events 310 through process 500 concurrently until step 560, where the order of the user events 310 must be maintained in the target machine queues 210.

For example, processing agent 200 begins the event recording as in step 510, and detects the mouse moving on the master machine 110 and registers the move as an event (step 520). Processing agent 200 generates an action request 320 with a command 330 to "find element and move the mouse to it" (step 530). The action request 320 contains a command 330 to "find element," a command 330 to "get element location," and a command 330 to "move the mouse to a location." Processing agent 200 determines that finding the mouse and the movement destination is the type of action request 320 that requires a set of action paths 340 for the target machine to perform the "find element" command 330 (step 540). Processing agent 200 then generates a set of action paths 340 for the "find element" command 330 in the action request 320 and adds the set of action paths 340 to the action request 320 (step 550). Processing agent 200 then adds a copy of the action request 320 to each target machine queue 210 (step 560).

Processing agent 200 continues to monitor the user input as the mouse movement user event is being processed, and will detect other user events such as the user clicking on a UI element after moving the mouse. Processing agent 200 registers the click as an event (step 520), generates an action request 320 for the "click" type event with a command 330 to "click" (step 530). Processing agent 200 evaluates whether the "click" command requires action paths (step 540). Processing agent 200 determines that the "click" command does not require action paths, so processing agent 200 places a copy of the action request 320 with the "click" command 330 into each of the target machine queues 210. The process 500 continues for subsequent user input with one or more commands 330 for each action request 320, such as detecting individual keystrokes as the user enters information into a form. For example, a user event 310 for a keystroke for a capital letter "D" would require the processing agent 200 to generate an action request 320 including four commands 330—press "shift key", press "d key," release "d key," and release "shift key." As the individual action requests 320 are generated, playback manager 220 executes the next action request 320 from each target machine queue 210.

Figure 6:
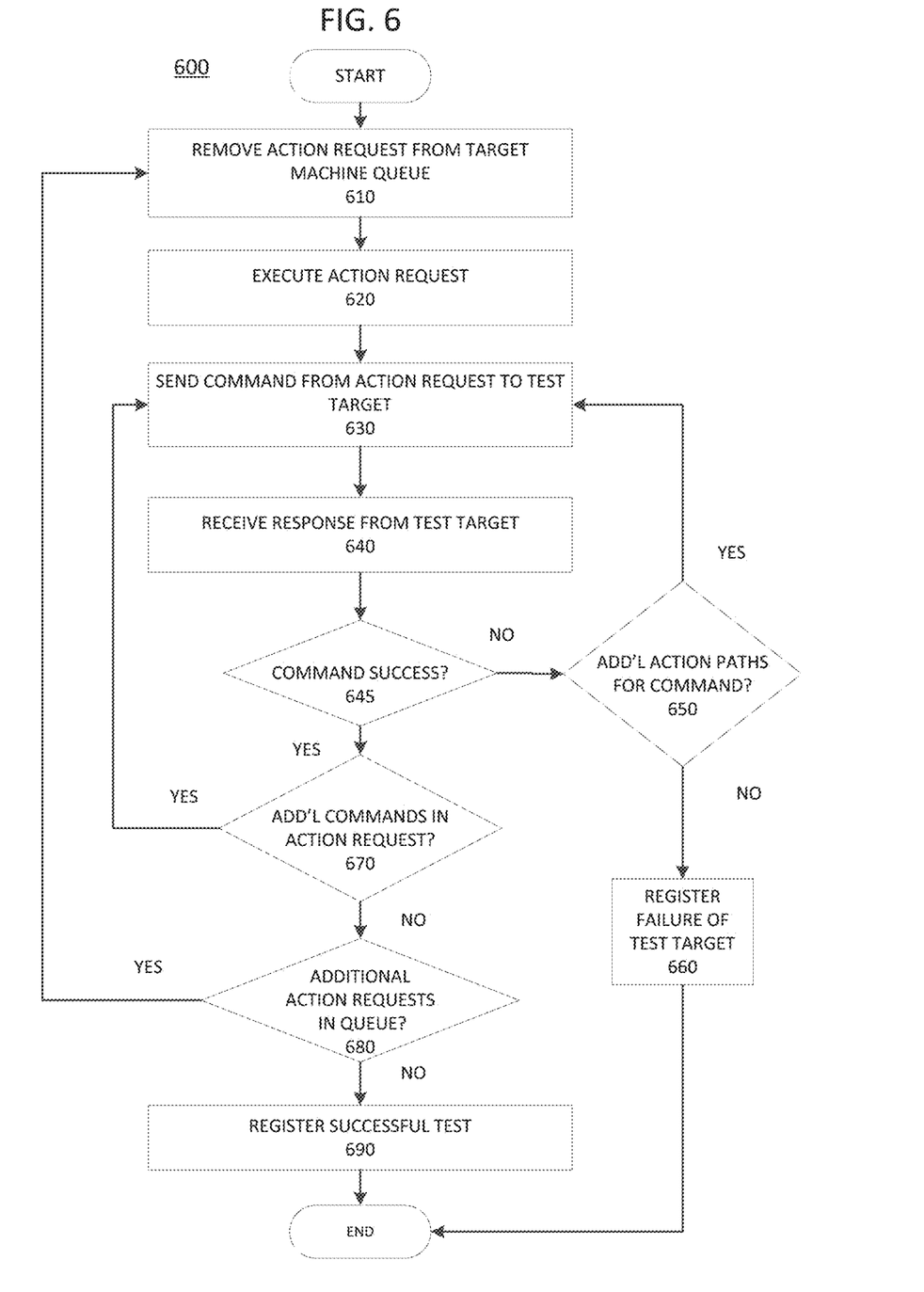
FIG. 6 is a flow chart illustrating a process for testing user events on test target machines, according to one embodiment.

FIG. 6 illustrates a process for testing user events on test target machines, according to an embodiment. As shown, playback manager 220 begins process 600 at step 610 by removing an action request 320 from a target machine queue 210 associated with the test target 120. At step 620, playback manager 220 executes the action request 320 that, at step 630, sends a command 330 in the action request 320 to the test target 120 according the logic in the action request 320. At step 640, action request 320 receives a response from the test target 120. At step 645, action request 340 evaluates the response to determine whether the command 330 was successfully executed by the test target 120. If not, the process proceeds to step 650, where action request 320 determines whether additional action paths 340 for the command 330 are available. If so, the process returns to step 630 with the action request 320 sending the command 330 with the next action path 340. If no additional action paths 340 exist for the command 330, then command 330 fails, and at step 660 playback manager 220 records the test target 120 as a failure.

In an embodiment, playback manager 220 records the action request 320 and specific command 330 that failed as part of step 650. Returning now to step 645, when the test target 120 response is a success, at step 670 action request 320 determines whether there are additional commands in the action event 320 to send to the test target. If so, the process returns to step 630 where the next command is sent from the action request 320. If no more commands need to be sent, according to the logic in the action request 320, the action request 320 is complete. At step 680, playback manager 220 determines whether target machine queue 210 includes action requests 320 for additional events, and if so the process returns to step 610. If there are no action requests 320 for additional user events in the target machine queue 210, then at step 690 playback manager 220 registers a successful test for the test target 120.

In an embodiment, playback manager 220 can wait for action requests 320 to be added to the target machine queue 210 if the target machine queue 210 is empty. In this embodiment, a successful test is registered when playback manager 220 receives a command that the test is complete, a time-out threshold is reached, or receives another indication that the test has ended.

Figure 7:
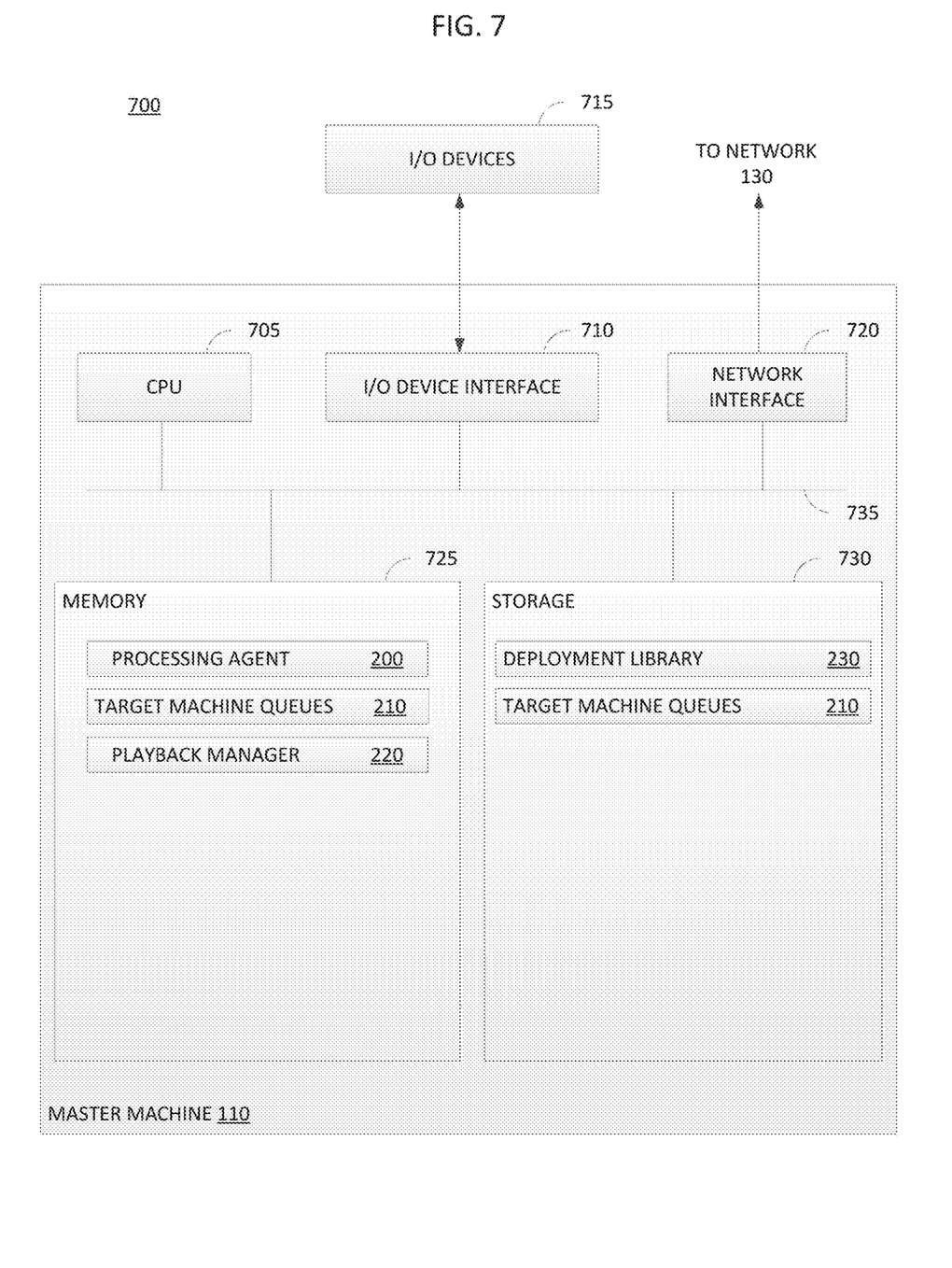
FIG. 7 illustrates an example computing system for testing multiple test targets using a master machine, according to one embodiment.

FIG. 7 illustrates an example computing system for testing multiple test targets using a master machine. As shown, the system 700 includes, without limitation, a central processing unit (CPU) 705, one or more I/O device interfaces 710 which may allow for the connection of various I/O devices 715 (e.g. keyboards, displays, mouse devices, pen inputs, etc.) to the system 700, network interface 720, a memory 725, storage 730, and an interconnect 735.

CPU 705 may retrieve and execute programming instructions stored in the memory 725. Similarly, the CPU 705 may retrieve and store application data residing in memory 725. The interconnect 735, transmits programming instructions and application data, among the CPU 705, I/O device interface 710, network interface 720, memory 725, and storage 730. CPU 705 is included to be representative of a single CPU, multiple CPUs, a single CPU having multiple processing cores, and the like. Additionally, the memory 725 is included to be representative of a random access memory. Furthermore, the storage 730 may be a disk drive, solid state drive, or a collection of storage devices distributed across multiple storage systems. Although shown as a single unit, the storage 730 may be a combination of fixed and/or removable storage devices, such as fixed disc drives, removable memory cards or optical storage, network attached storage (NAS), or a storage area-network (SAN).

As shown, memory 725 includes processing agent 200, target machine queue 210, and playback manager 220. Processing agent 200 receives user input from I/O devices 715 through I/O device interface 710, which processing agent 200 monitors to identify user events 310. Processing agent 200 generates action requests 320 describing user events 310 including one or more commands 330. Some types of action requests 320 require a set of action paths 340 that are used by a command 330. Processing agent 200 generates the set of action paths 340 to describe the user event 310 observed, and that are used to perform the command 330 on a test target machine 120. Each action request 320 is added to each target machine queue 210 in memory 725. In an embodiment, target machine queues 210 can be maintained in storage 730 instead of memory 725, or target machine queues 210 can be maintained in a combination of memory 725 and storage 730. Playback manager 220 executes each action request 320 that communicates with the test target 120 through network 130 using network interface 720. Playback manager 220 removes action requests 320 from the target machine queue 210 dedicated to a test target 120, executes the action request 320, which sends commands 330 to the test target 120 via network 103, and receives responses for each action request 320 from the test target 120. Playback manager 220 continues executing action requests 320 from the target machine queue 210 for each test target 120 until each test target 120 individually fails to execute an action request 320 for a user event 310, or until each test machine 120 has successfully executed all of the action requests 320 for user events 310 in the test.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for concurrently testing multiple machines comprising:
   detecting, on a master machine, a user event related to an application;
   generating an action request representing the user event;
   upon determining that the action request includes a command to locate a given program element via an action path:
      generating a set of action paths corresponding to the user event, wherein:
         each action path of the set of action paths is formatted to locate the given program element for a respective variation of a plurality of variations of the application, and
         each variation of the plurality of variations of the application corresponds to one or more items selected from an application version, an operating system version; or a hardware configuration;
      associating the set of action paths with the action request; and
      adding the action request to each target machine queue of a set of target machine queues, wherein:
         each target machine queue of the set of target machine queues is an independent queue for executing action requests for a respective target machine of a plurality of target machines, and
         each target machine of the plurality of target machines corresponds to a given variation of the plurality of variations of the application.

2. The method of claim 1, further comprising:
   removing a particular action request from a target machine queue of the set of target machine queues, wherein the particular action request includes a particular command with a particular set of action paths;
   executing the particular action request by:
      sending a first command including a first action path from the particular set of action paths from the particular action request to a target machine associated with the target machine queue;
      receiving a first response from the target machine, wherein the first response includes a result for the first command;
      upon determining that the first response comprises a failure, sending a second command including a second action path from the particular set of action paths to the target machine;
      receiving a second response from the target machine including a result of the second command including the second action path; and
      upon determining that the second response comprises a success, registering the particular action request as complete.

3. The method of claim 2, wherein each action path of the particular set of action paths comprises a Selenium XPath.

4. The method of claim 2, further comprising:
   upon determining that the target machine queue does not contain a second action request, generating a visual indicator in a user interface indicating that the particular action request registered as a success; and
   displaying the user interface on the master machine.

5. The method of claim 1, further comprising:
   removing a particular action request from a first target machine queue of the set of target machine queues, wherein the particular action request includes a first command with a first set of action paths;
   executing the particular action request for a first target machine of the plurality of target machines by:
      sending a first command including a first action path from the first set of action paths from the particular action request to the first target machine;
      receiving a response from the first target machine, wherein the response includes a result for the first command;
      upon determining that the response comprises a failure, sending a second command including a second action path to the first target machine;
      receiving a second response from the first target machine including a result of the second command including the second action path;
   upon determining that the second response comprises a success, registering the particular action request as complete;
   removing the particular action request from a second target machine queue of the set of target machine queues;
   executing the particular action request for a second target machine of the plurality of target machines by:
      sending a third command including a second action path from the first set of action paths to the second target machine;
      receiving a third response from the second target machine, wherein the third response includes a result for the third command; and
      upon determining that the third response comprises a success, registering the particular action request as complete.

6. The method of claim 5, wherein the first target machine executes a Windows® operating system and the second target machine executes a Mac® OS X® operating system.

7. The method of claim 1, wherein the command comprises a hypertext transfer protocol request.

8. A system, comprising:
   a processor; and
   memory storing instructions which, when executed on the processor, cause the system to perform a method for concurrently testing multiple machines, the method comprising:
      detecting, on a master machine, a user event related to an application;
      generating an action request representing the user event;
      upon determining that the action request includes a command to locate a given program element via an action path:
         generating a set of action paths corresponding to the user event, wherein:
            each action path of the set of action paths is formatted to locate the given program element for a respective variation of a plurality of variations of the application, and
            each variation of the plurality of variations of the application corresponds to one or more items selected from: an application version; an operating system version; or a hardware configuration;
         associating the set of action paths with the action request; and
         adding the action request to each target machine queue of a set of target machine queues, wherein:
            each target machine queue of the set of target machine queues is an independent queue for executing action requests for a respective target machine of a plurality of target machines, and each target machine of the plurality of target machines corresponds to a given variation of the plurality of variations of the application.

9. The system of claim 8, the method further comprising:
removing a particular action request from a target machine queue of the set of target machine queues, wherein the particular action request includes a particular command with a particular set of action paths;
executing the particular action request by:
sending a first command including a first action path from the particular set of action paths from the particular action request to a target machine associated with the target machine queue;
receiving a first response from the target machine, wherein the first response includes a result for the first command;
upon determining that the first response comprises a failure, sending a second command including a second action path from the particular set of action paths to the target machine;
receiving a second response from the target machine including a result of the second command including the second action path; and
upon determining that the second response comprises a success, registering the particular action request as complete.

10. The system of claim 9, wherein each action path of the particular set of action paths comprises a Selenium XPath.

11. The system of claim 9, the method further comprising:
upon determining that the target machine queue does not contain a second action request, generating a visual indicator in a user interface indicating that the particular action request registered as a success; and
displaying the user interface on the master machine.

12. The system of claim 8, the method further comprising:
removing a particular action request from a first target machine queue of the set of target machine queues, wherein the particular action request includes a first command with a first set of action paths;
executing the particular action request for a first target machine of the plurality of target machines by:
sending a first command including a first action path from the first set of action paths from the particular action request to the first target machine;
receiving a response from the first target machine, wherein the response includes a result for the first command;
upon determining that the response comprises a failure, sending a second command including a second action path to the first target machine;
receiving a second response from the first target machine including a result of the second command including the second action path;
upon determining that the second response comprises a success, registering the particular action request as complete;
removing the particular action request from a second target machine queue of the set of target machine queues;
executing the particular action request for a second target machine of the plurality of target machines by:
sending a third command including a second action path from the first set of action paths to the second target machine;
receiving a third response from the second target machine, wherein the third response includes a result for the third command; and
upon determining that the third response comprises a success, registering the particular action request as complete.

13. The system of claim 12, wherein the first target machine executes a Windows® operating system and the second target machine executes a Mac® OS X® operating system.

14. The system of claim 9, wherein the command comprises a hypertext transfer protocol request.

15. A non-transitory computer-readable medium comprising instructions which, when executed by one or more processors, performs an operation for testing multiple machines, the operation comprising:
detecting, on a master machine, a user event related to an application;
generating an action request representing the user event;
upon determining that the action request includes a command to locate a given program element via an action path:
generating a set of action paths corresponding to the user event, wherein:
each action path of the set of action paths is formatted to locate the given program element for a respective variation of a plurality of variations of the application, and
each variation of the plurality of variations of the application corresponds to one or more items selected from: an application version; and operating system version; or a hardware configuration;
associating the set of action paths with the action request; and
adding the action request to each target machine queue of a set of target machine queues, wherein;
each target machine queue of the set of target machine queues is an independent queue for executing action requests for a respective target machine of a plurality of target machines, and
each target machine of the plurality of target machines corresponds to a given variation of the plurality of variations of the application.

16. The non-transitory computer-readable medium of claim 15, the operation further comprising:
removing a particular action request from a target machine queue of the set of target machine queues, wherein the particular action request includes a particular command with a particular set of action paths;
executing the particular action request by:
sending a first command including a first action path from the particular set of action paths from the particular action request to a target machine associated with the target machine queue;
receiving a first response from the target machine, wherein the first response includes a result for the first command;
upon determining that the first response comprises a failure, sending a second command including a second action path from the particular set of action paths to the target machine;
receiving a second response from the target machine including a result of the second command including the second action path; and
upon determining that the second response comprises a success, registering the particular action request as complete.

17. The non-transitory computer-readable medium of claim 16, wherein each action path of the particular set of action paths comprises a Selenium XPath.

18. The non-transitory computer-readable medium of claim 16, wherein the operation further comprises:
   upon determining that the target machine queue does not contain a second action request, generating a visual indicator in a user interface indicating that the particular action request registered as a success; and
   displaying the user interface on the master machine.

19. The non-transitory computer-readable medium of claim 15, wherein the operation further comprises:
   removing a particular action request from a first target machine queue of the set of target machine queues, wherein the particular action request includes a first command with a first set of action paths;
   executing the particular action request for a first target machine of the plurality of target machines by:
      sending a first command including a first action path from the first set of action paths from the particular action request to the first target machine;
      receiving a response from the first target machine, wherein the response includes a result for the first command;
      upon determining that the response comprises a failure, sending a second command including a second action path to the first target machine;
      receiving a second response from the first target machine including a result of the second command including the second action path;
   upon determining that the second response comprises a success, registering the particular action request as complete;
   removing the particular action request from a second target machine queue of the set of target machine queues;
   executing the particular action request for a second target machine of the plurality of target machines by:
      sending a third command including a second action path from the first set of action paths to the second target machine;
      receiving a third response from the second target machine, wherein the third response includes a result for the third command; and
      upon determining that the third response comprises a success, registering the particular action request as complete.

20. The non-transitory computer-readable medium of claim 19, wherein the first target machine executes a Windows® operating system and the second target machine executes a Mac® OS X® operating system.

* * * * *